US006427256B1

(12) United States Patent
Mullett et al.

(10) Patent No.: US 6,427,256 B1
(45) Date of Patent: Aug. 6, 2002

(54) KNOCKDOWN PORTABLE TOILET

(75) Inventors: Rodney M. Mullett; Jamie Kostelyk, both of Hammond; Daniel G. Tyler, Crown Point, all of IN (US)

(73) Assignee: PolyJohn Enterprises Corporation, Whiting, IN (US)

( * ) Notice: Subject to any disclaimer, the term of this patent is extended or adjusted under 35 U.S.C. 154(b) by 0 days.

(21) Appl. No.: 09/697,261

(22) Filed: Oct. 26, 2000

(51) Int. Cl.[7] ............................................... A47K 11/04
(52) U.S. Cl. ............................. 4/476; 4/449; 52/79.6; 52/79.1
(58) Field of Search ........................... 4/449, 459, 461, 4/462, 463, 476–480, 483, 321–323; 52/79.1, 36.1, 36.2, 34, 79.5, 79.6; 403/335, 336, 391

(56) References Cited

U.S. PATENT DOCUMENTS

| 245,833 A | * | 8/1881 | Imse ............................... 4/476 |
| 460,361 A | * | 9/1891 | Cracknell ........................ 4/476 |
| 1,496,843 A | * | 6/1924 | Larm .............................. 4/483 |
| 2,023,514 A | * | 12/1935 | Castanien ....................... 4/476 |
| 2,506,502 A | * | 5/1950 | Herrmann ....................... 4/473 |
| 3,629,874 A | * | 12/1971 | Beller ............................. 4/462 |
| 4,380,836 A | * | 4/1983 | Braxton .......................... 4/460 |
| 4,446,585 A | * | 5/1984 | Harding et al. ................. 4/460 |
| 5,398,468 A | * | 3/1995 | Erickson ..................... 52/282.3 |
| 5,500,960 A | * | 3/1996 | Tagg ............................... 4/318 |
| 5,560,050 A | * | 10/1996 | Tagg ............................... 4/449 |

* cited by examiner

Primary Examiner—Gregory Huson
Assistant Examiner—Huyen Le
(74) Attorney, Agent, or Firm—Harness, Dickey & Pierce, P.L.C.

(57) ABSTRACT

A knockdown portable toilet cabana comprises substantially identical panels forming opposite, vertical side walls and a rear wall, and a front panel having an access opening with a door covering the opening and hingedly connected to the front panel. The lower edges of the panels are engaged with a floor forming base and a covering roof is arranged at the upper ends of the panels. The lower edges of the panels and the corresponding peripheral edges of the base are provided with interconnecting channels and tongues for releaseably attaching, and for detaching the panels and the base. The upper edges of the panels and the corresponding edges of the roof are provided with releaseable connectors for attaching and detaching the roof from the panels. Elongated channel members frictionally engage and releaseably connect together the adjacent vertical edges of the panels. A toilet waste holding tank is removably positioned within the cabana. An inner removable metal container is positioned within the tank to receive waste and may be removed from the tank for disposal of the waste contained therein. Thus, the cabana and toilet may be manually assembled for use when and where needed during a limited period of time and disassembled for transport and storage of the separate parts when not in use.

12 Claims, 5 Drawing Sheets

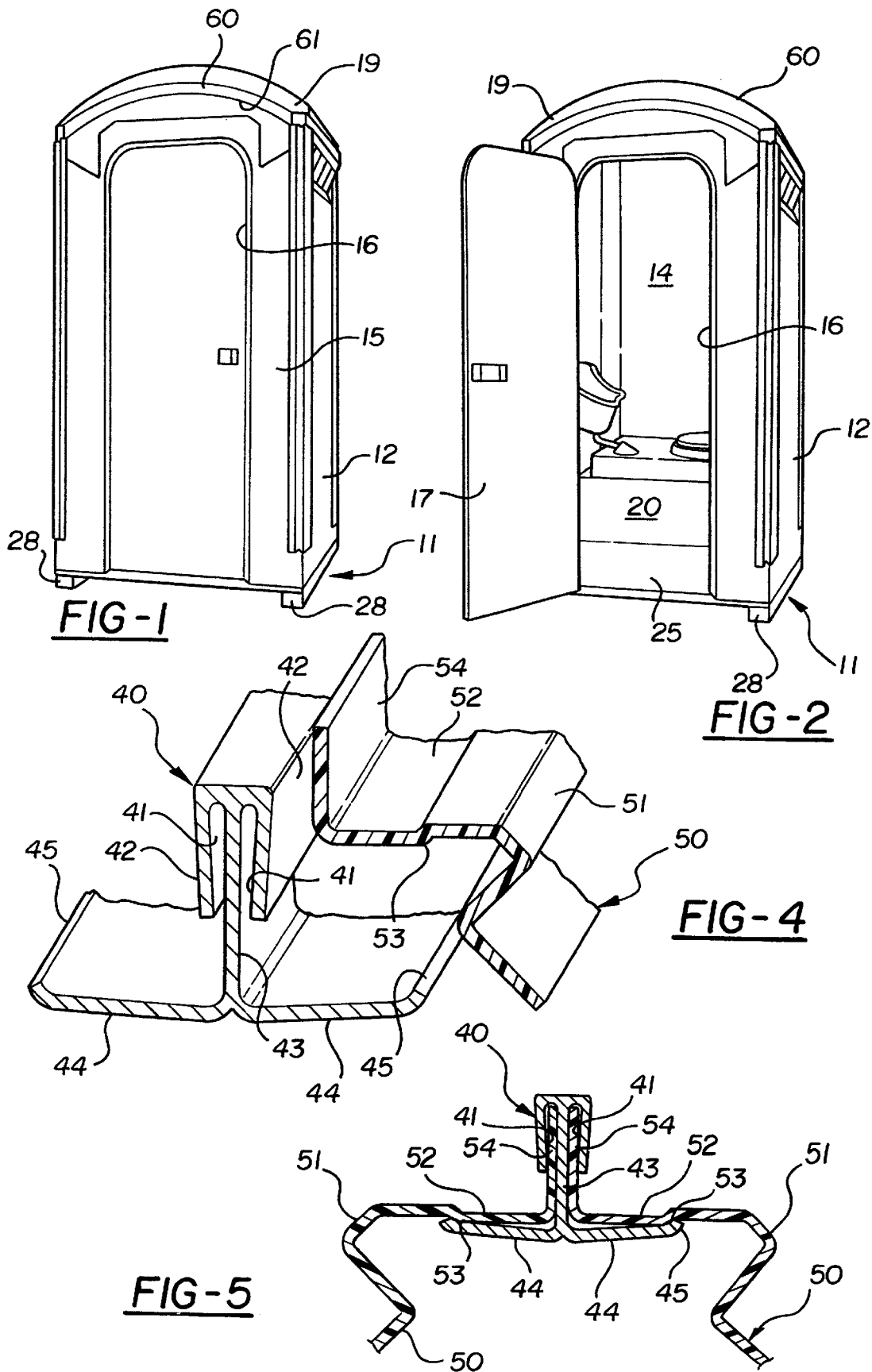

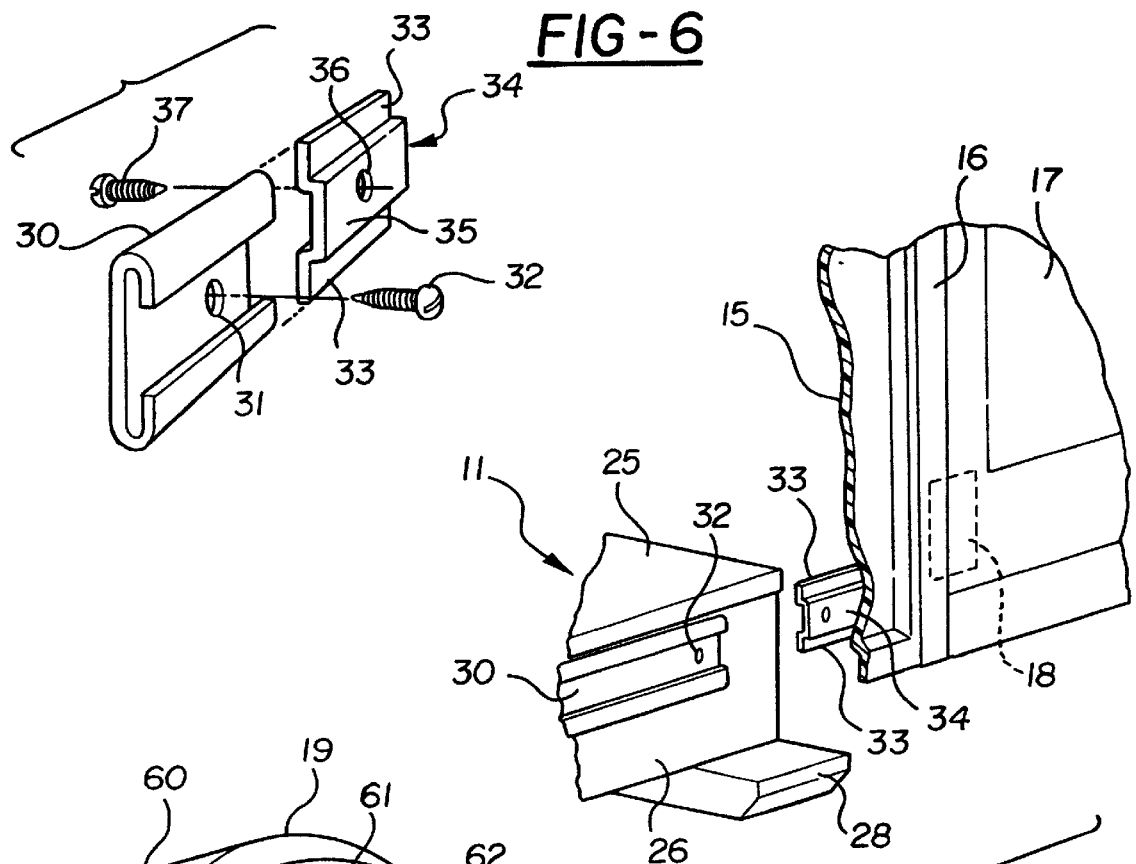
FIG-6
FIG-7
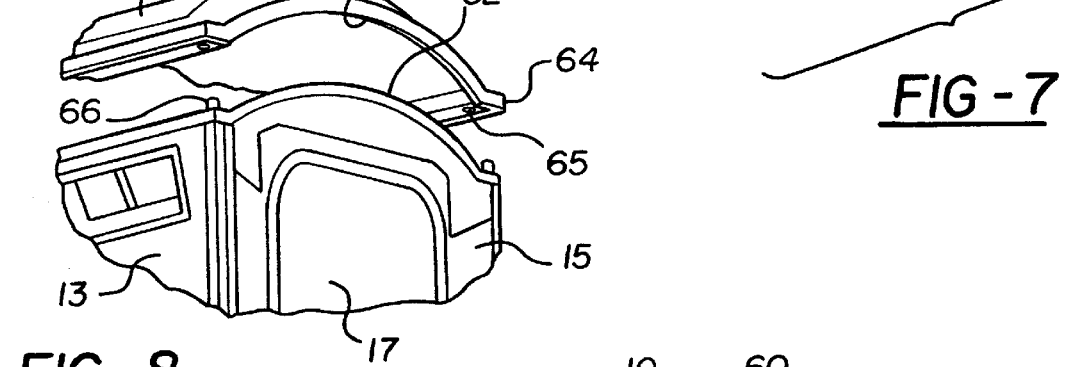
FIG-8
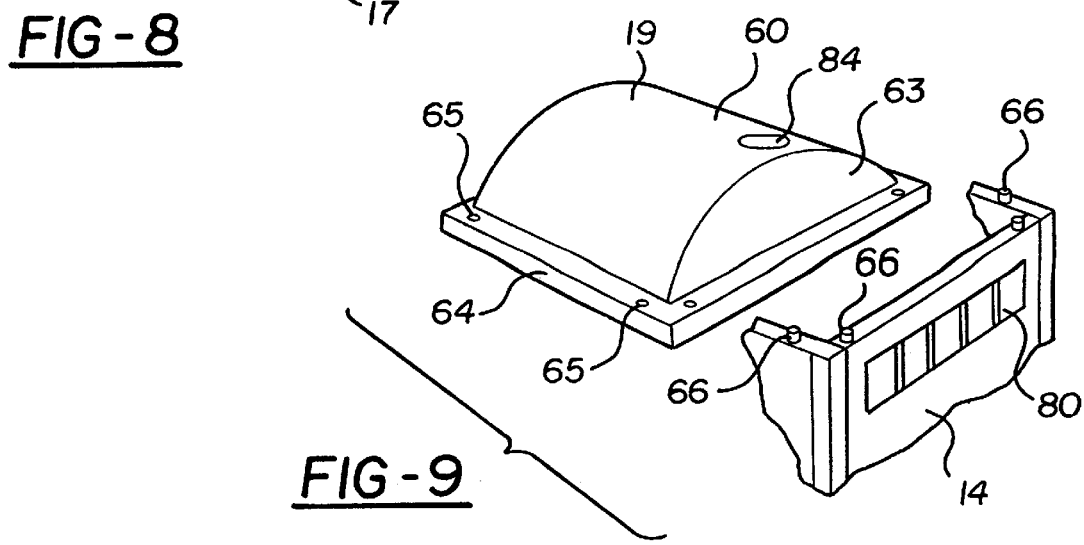
FIG-9

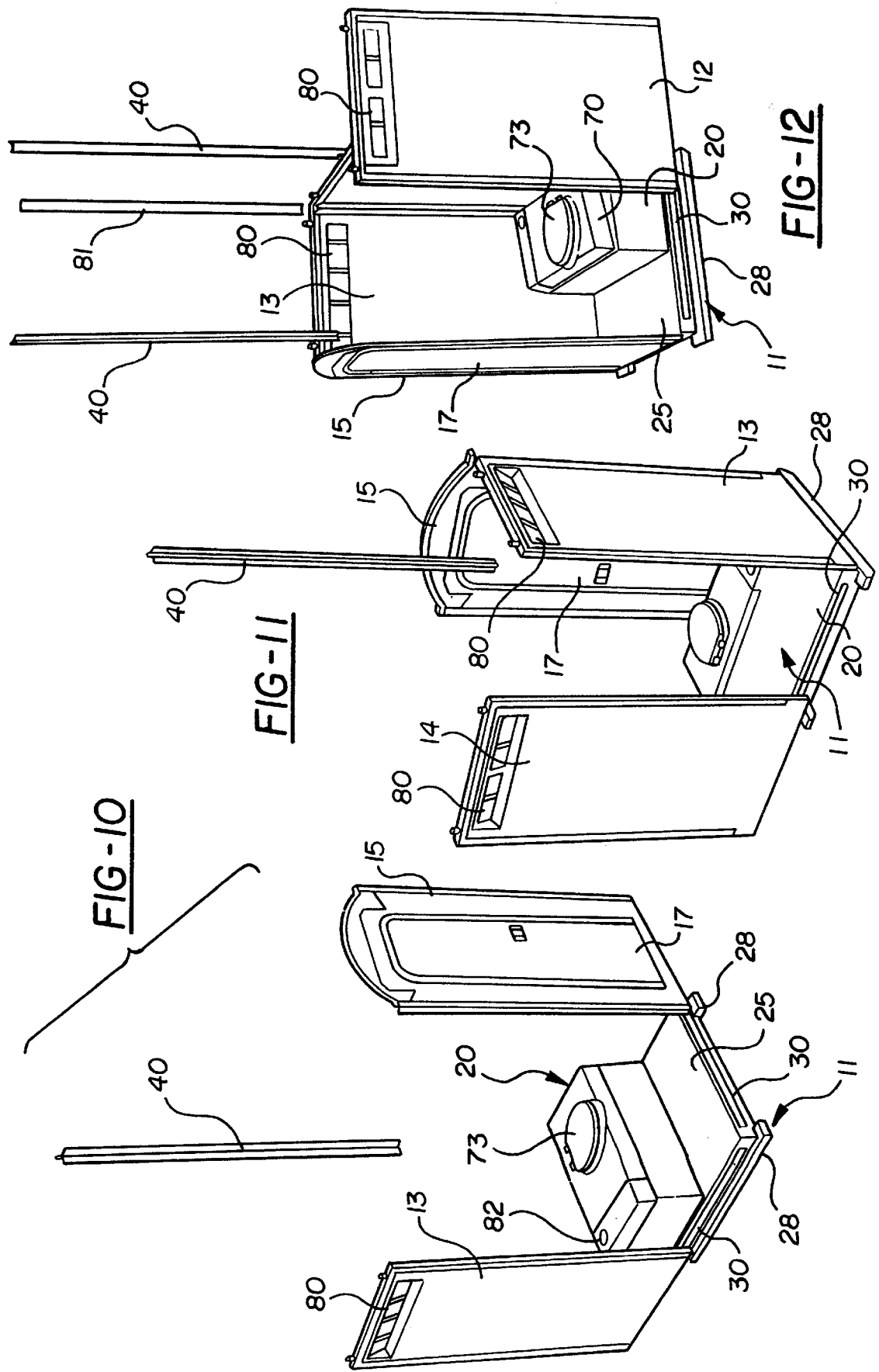

KNOCKDOWN PORTABLE TOILET

This invention relates to improvements in portable toilet or "restroom" constructions by which a portable toilet cabana and waste holding tank may be formed of separate components which may be stored and transported to a use site and then manually assembled for temporary toilet use, following which the components may be disassembled for return transportation and storage.

BACKGROUND OF INVENTION

Portable toilets, which are sometimes referred to as restrooms or out-houses, are conventionally made of large wall panels which are assembled upon a base and provided with a covering roof for forming an enclosure or cabana containing a toilet and waste storage tank. Conventionally, the cabana walls are made of plastic panels which are secured together along their adjacent vertical edges with their lower edges secured to the base. The various components that make up the portable toilet cabanas are usually factory assembled so that the cabanas are transported in assembled condition to the site where they are to be used. Periodically during use, the waste storage tanks are emptied, such as by use of pumping equipment that pumps, through a pipe, the waste contained in the waste storage tanks into a large tank carried upon a service vehicle. When a toilet is no longer needed at a particular use site, such as at a construction site or a public event, the assembled toilet is picked up and placed upon a vehicle and transported to another use site or to a storage facility to await further use.

Examples of known types of portable toilet cabanas or restrooms are disclosed in U.S. Pat. No. 4,577,351 issued Mar. 25, 1986 to George W. Harding; U.S. Pat. No. 4,831,671 issued May 23, 1989 to George W. Harding; U.S. Pat. No. 4,918,765 issued Apr. 24, 1990 to George W. Harding; and U.S. Pat. No. 5,682,622 issued Nov. 4, 1997 to Richard Leach Tagg. Each of these patents disclose a construction wherein the restroom or cabana is formed of large plastic panels that are joined together along their vertical adjacent edges and to a base by suitable connectors which provide a rigid enclosure that may be transported, used and then re-transported as a completely assembled unit.

Since portable toilet cabanas or restrooms are relatively large in size, the number of assembled units that can be transported on a vehicle, such as a truck, is limited. Thus, in an effort to reduce the sizes of portable toilet restrooms or cabanas, particularly for transportation and storage, attempts have been made to connect the wall, floor and roof panels together in a way that permits them to be folded relative to each other into a relatively flat condition. Examples of such constructions are shown in U.S. Pat. No. 4,305,164 issued Dec. 15, 1981 to Frank T. Sargent et al and U.S. Pat. No. 4,493,118 issued Jan. 15, 1985 to Earl J. Braxton.

U.S. Pat. No. 4,493,118 shows walls that are hingedly connected together. Two of the wall panels are formed of hinged sections. This permits folding of the walls into a generally flat arrangement which can be assembled for use at a particular site when needed. U.S. Pat. No. 4,305,164 discloses separable walls.

Because these portable toilet restrooms take considerable abuse and are subject to vandalism or other forces accidentally applied to them, including the forces of wind and severe weather conditions, considerable strength and rigidity is required to fasten the components together and to maintain the structural integrity of the assembly. Moreover, it would be desired to have a structure whose components may be manually assembled together rapidly without tools, and similarly disassembled.

Thus, this invention is concerned with a plastic panel type of portable toilet restroom or cabana which may be rapidly assembled and disassembled manually, without tools, and which, when assembled, forms a rigid structure that is able to resist impacts or severe wind forces. Large numbers of such disassembled cabanas may be transported on trucks or in aircraft or compactly stored.

SUMMARY OF INVENTION

This invention contemplates a portable toilet restroom or cabana formed of substantially similar plastic wall panels connected together along their vertical edges and connected at their lower edges to a base or pallet, with a covering roof. The wall and base components are secured together frictionally by simplified tongue and groove types of connections. In the case of the roof, simplified pin fasteners hold the roof in place. Preferably the vertical edges of the panels are formed with resilient edge strips or flanges which frictionally are held within elongated channel members. Thus, the edge strips are tightly interlocked within the channels by both friction and the springiness of the plastic material. The channel members are slid downwardly, endwise, over adjacent panel edge strips to interlock the adjacent edges of each pair of panels. The lower edges of the panels may be interlocked with the flat base or pallet by means of horizontal channels that receive tongues or flange strips formed on the base and the lower edges of the panels.

Further, it is contemplated to provide a separate waste holding tank that is positioned upon the base within the cabana. Preferably the tank contains an inner metal container which forms a removable burn container. The container may be manually removed from the cabana, so that its waste contents may be burned in the container by utilizing a suitable flammable material. This system empties the waste tank without the need for waste removal equipment.

An object of this invention is to provide a portable toilet construction formed of a number of separated components which may be stored and then transported as separate pieces. The pieces may be rapidly, manually assembled, with either no tools or with minimal tools, into a useable restroom. Similarly, the restroom may be rapidly disassembled manually, for transportation of its separate components to storage sites or to other use sites.

Another object of this invention is to provide a portable toilet restroom facility having a waste collection system by which human waste may be manually removed within a container mounted within a waste holding tank. The collected waste may be burned in the container or may be dumped manually. Therefore, separate waste removal equipment, such as tank trucks are not required.

Still a further object of this invention is to provide a portable toilet restroom or cabana that, upon assembly, is rigid and has sufficient strength to resist impacts, wind forces and other shocks and yet may be rapidly assembled and disassembled. The construction utilizes connectors which enable the walls and the base components to be quickly slid relative to each other into rigid interconnections that are held by friction and by inherent springiness of the plastic sheet material forming the components.

Yet another object of this invention is to provide a portable toilet restroom or cabana made of separate components which are interchangeable or replaceable with similar components so that in the event of damage to any particular component, another similar component that may be available at the same site may be utilized immediately for replacement and repair of the unit to, therefore, maintain the toilet for immediate availability.

These and other objects and advantages of this invention will become apparent upon reading the following description, of which the attached drawings form a part. In these drawings:

DESCRIPTION OF DRAWINGS

FIG. 1 illustrates a portable toilet restroom or cabana, shown in perspective.

FIG. 2 is a view similar to FIG. 1, but showing the cabana door in its open position.

FIG. 4 is a perspective, enlarged, fragmentary view of an edge of a wall panel and a corner connector member for joining the adjacent vertical edges of a pair of panels.

FIG. 5 is an enlarged, cross-sectional view illustrating the interconnection between the vertical edges of two panels and the corner connector.

FIG. 6 is a perspective, fragmentary view of a connector for connection of the lower edge of a wall panel to the base, the connector being formed of a horizontally oriented channel into which a horizontally oriented strip having opposed tongues is slid.

FIG. 7 is a fragmentary, perspective view of the connection between the front, door carrying, panel and the base, showing the base channel and the panel tongue member positioned for slidable connection.

FIG. 8 is a perspective, fragmentary view showing the roof arranged over the panels and ready to be moved downwardly for connection thereto.

FIG. 9 is a perspective view of the roof showing the rear and side view of the roof.

FIG. 10 is a perspective view illustrating the step in connecting one of the side panels and the front, door bearing, panel to the base.

FIG. 11 illustrates a following step in the assembly, that is, the positioning of the rear panel upon the base, and FIG. 12 illustrates the assembly of the remaining side panel upon the base for completion of the enclosure which forms the cabana.

DETAILED DESCRIPTION

Figure 3:
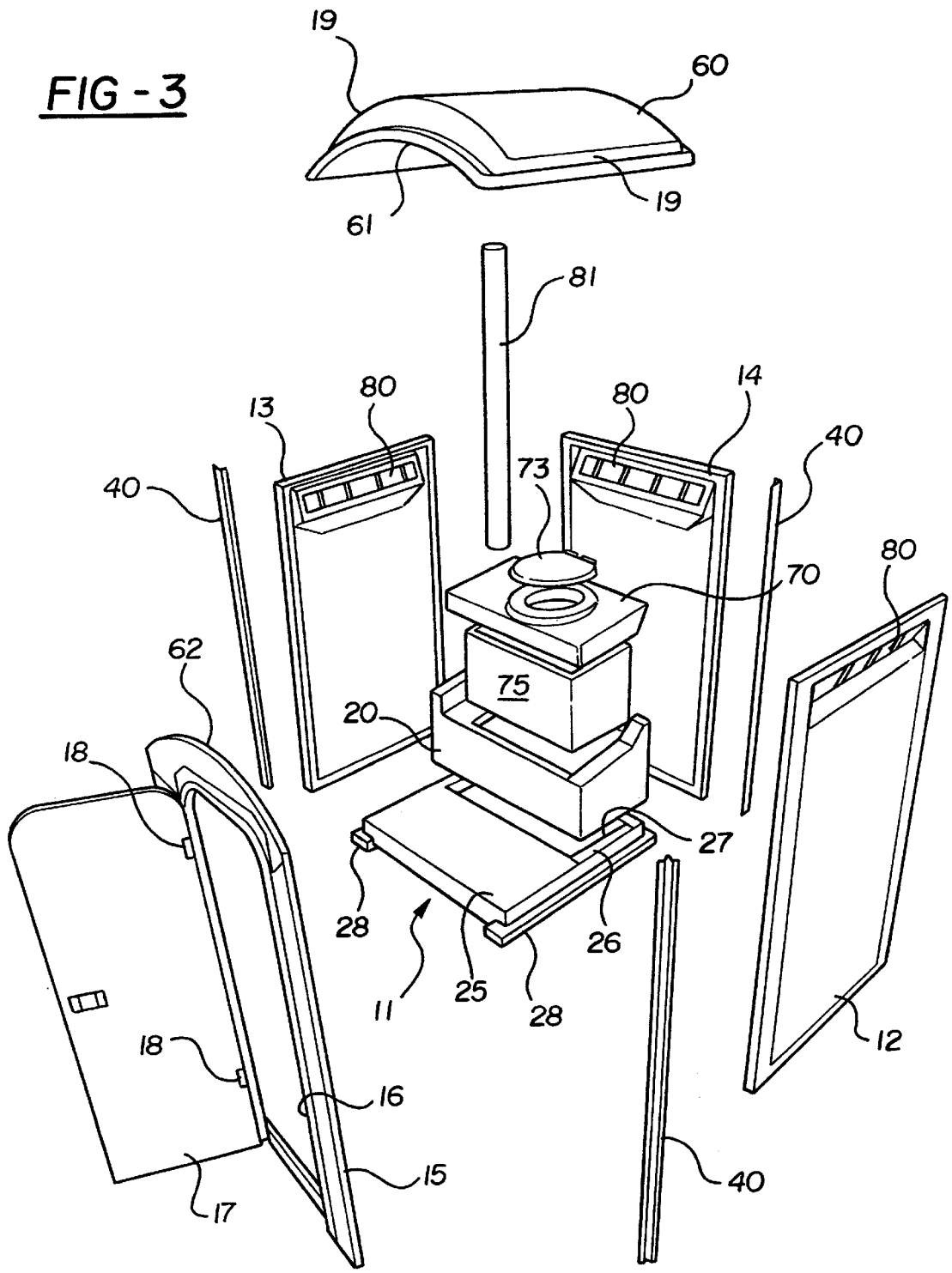
FIG. 3 is an exploded, perspective, disassembled view of the major components of the restroom or cabana.
Figure 13:
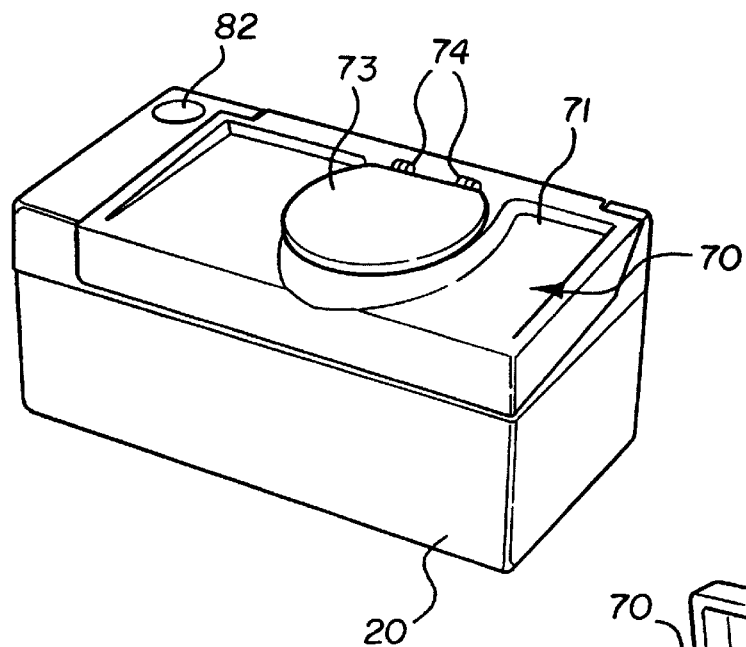
FIG. 13 is a perspective view, shown to a larger scale, of the waste tank and the toilet arranged upon the upper cover of the tank.
Figure 14:
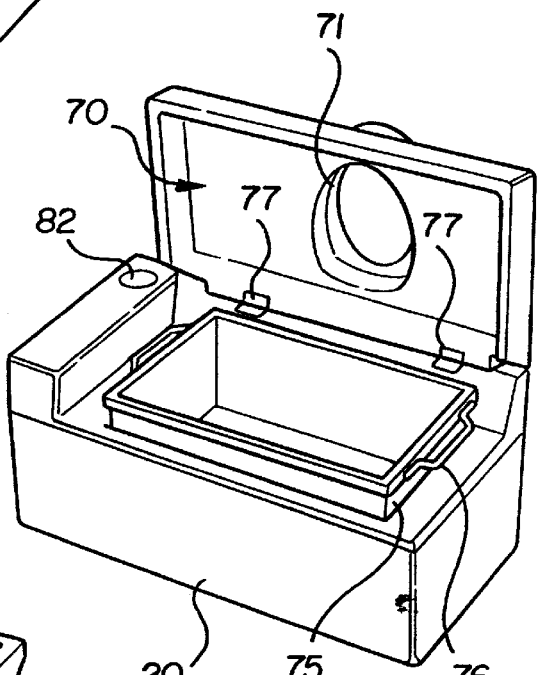
FIG. 14 is a perspective view showing the cover of the waste tank opened and exposing the inner waste burn container located within the waste tank.
Figure 15:
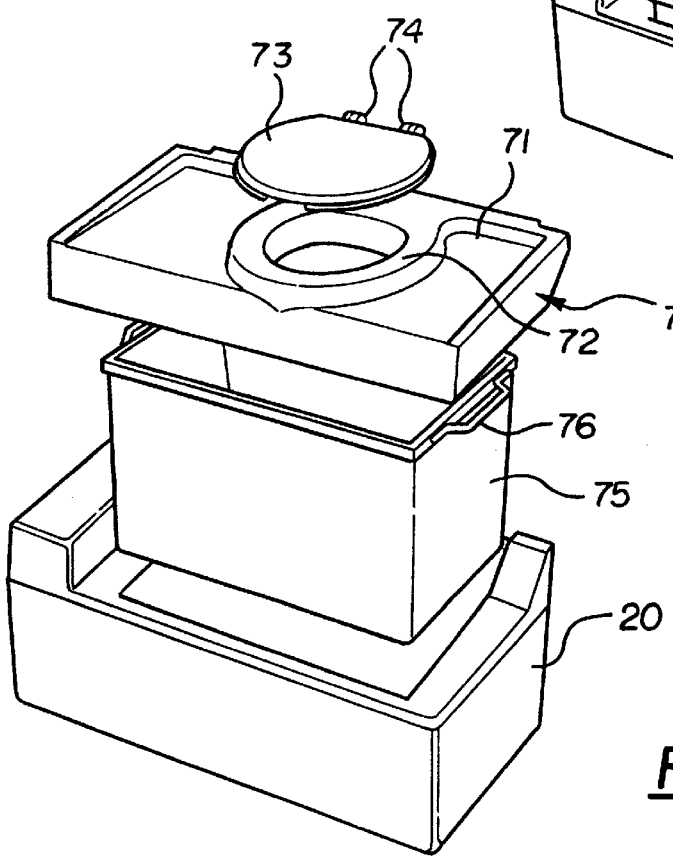
FIG. 15 illustrates the tank cover lifted upwardly from the waste tank and the waste burn container removed from the tank.

Referring to FIGS. 1–3, the portable toilet restroom 10 is formed of a number of separate components. The cabana or restroom structure has a base 11, formed as a support pallet to which the wall panels are connected. The walls are made of a side wall panel 12, an opposite side wall panel 13, a rear wall panel 14 and a front wall panel 15. The side and rear wall panels are substantially identical in construction in order to simplify the manufacture of the product, although they may be designed to be somewhat different. The front wall panel 15 has a doorway opening 16 which is covered by a swinging door 17. The door is connected by hinges 18 (see FIGS. 3 and 7) to the vertical side edge defining the doorway opening. A roof 19 covers the opening formed by the enclosure defined by the wall panels. A toilet waste tank 20 is positioned within the enclosure. (See FIG. 3).

The base 11 is provided with a floor panel 25 secured upon a frame 26. The floor panel is arranged forwardly of the toilet waste tank, leaving an opening 27 within which the toilet tank is fitted. The base includes a pair of skids or runners 28 fastened to the bottom of the frame 26. The skids permit the structure to be moved upon the ground when desired and, also, enable a fork truck or other lift mechanism to be inserted between the skids beneath the frame 26 for lifting the structure. Preferably, the frame, floor panel and skids are formed of an integral plastic molding. However, these elements may be separately formed, such as of wood material, and held together by screws or nails, as an alternative.

The wall forming panels are secured to the base by means of connector members. These connector members, as illustrated in FIG. 6 and FIG. 7 comprise horizontally elongated channel members 30. The channel members are provided with holes 31 for receiving screws 32 that fasten the channel members to the frame 26.

The connector members include tongue members 33 formed by flanges on the edges of strips 34. The tongues or flanges 33 are interconnected by a central web 35. Holes 36 formed in the central web receive screws or rivets or similar fasteners 37 that secure the strips 34 to the lower edges of the respective panels. Thus, the panels may be connected to the base by aligning their respective tongue members with the channels members 30 and sliding the tongue members 33 endwise relative to the base. While the tongue members and their strips are secured to the lower edges of the panels and the channel members 30 are secured along the sides of the base, those parts can be reversed to achieve the same fastening purposes.

In order to secure the panels to each other, vertical channel members 40 (see FIGS. 4 and 5) are provided. These channel members have a pair of side by side channels 41 and 42 which are separated by a central divider 43. Preferably, the opposite or outer flanges 42 which form the channels are sloped a small amount towards the central divider. And the central divider is extended into laterally extending side flanges 44 which are angled, slightly less than 90 degrees, from the central divider 43 of the channel members. The free edges 45 of the flanges 44 are bent or curved.

The vertical edges 50 of each of the panels are bent into outwardly extending ribs 51 (see FIG. 5) which are further extended into flanges 52 having bent or curved shoulder portions 53. The flanges terminate in approximately right angle extending vertical edge, tongue forming flanges 54.

For connection of the panels, the adjacent edges of each adjacent pair of panels are positioned with their adjacent vertical edges tongues 54 close together. The tongues 54 are fitted within the pair of channels 41 in the vertical channel members 40. This is accomplished by sliding the channel members vertically downwardly to capture the tongues 54. With that arrangement, the upturn free edges 45 of the channel member flanges 44 engage the shoulders 53 (as shown in FIG. 5). The inherent springiness of the plastic sheet material which is used to form the panels provides a springy force in addition to the friction, between the panel tongues and the internal surfaces of the channels 41 to lock tightly together the adjacent panel edges. Similarly, the resilient springiness of the plastic sheet and the metal channel member flanges grip the panel edges to the channel member flanges 44. Thus, the channel members rigidly connect and lock together the corners of the cabana. The channel members further provide a supporting column at the vertical corners of the cabana.

The roof 19 has a curved or domed central portion 60 that overlies the enclosure formed by the four panels. Preferably, the forward end 61 if the roof is curved to closely fit over a similarly formed curved edge 62 on the upper edge of the front panel 15.

The rear end of the cover 19 has a curved end portion 63 so that the cover fits closely over the upper, straight edge of the rear panel 14. However, where desired, the rear panel may also be formed with a curved upper edge, rather than a straight upper edge, and similarly, the roof would have a corresponding curved rear edge for closely overlapping the rear edge of the rear panel.

The cover is provided with a continuous edge flange 64 which may have openings 65 formed therein to received horizontally extending pins or projections 66 formed on the upper edges of the respective panels. The cover is preferably made of a plastic sheet material which is somewhat resilient. For assembly, the cover may be dropped down over the tops of the panels and the edge flange 64 may be manually bent so that the openings 65 are aligned with, and receive, the pins 66 to hold the cover in place.

The waste holding tank 20 is provided with a cover 70 having an upper surface in which a toilet opening 71 is formed. A conventional toilet seat 72 is arranged around the opening and may be covered by a toilet cover 73 that is connected to the waste tank cover by conventional hinges 74.

Toilet waste may be dropped by gravity through the toilet opening 71 directly into the waste holding tank 20. However, preferably, a metal burn container or box 75 is positioned within the tank 70. The container may have side handles 76 so that it may be grasped and lifted upwardly and forwardly out of the tank when desired. For that purpose, the tank cover 70 may be connected by hinges 77 to the tank. Thus, the cover may be pivoted into an open position, as shown in FIG. 4, to expose the container 76.

The contents of the metal burn container may be incinerated by removing the container from the tank and carrying it a short distance away from the cabana. By applying a combustible fluid, such as gasoline or oil, the contents of the container may be burned. Preferably, the container is made of a suitable sheet metal material, such as steel sheets, while the tank may be formed of conventional plastic sheet material.

Since the contents of the metal burn container may be emptied by manually removing the container and burning its contents periodically, conventional portable toilet emptying equipment need not be provided. Normally, portable toilet waste tanks require emptying periodically. This is usually accomplished by means of a suitable large tank mounted upon a truck with a hose that is inserted into the waste holding tank. Pumping equipment on the truck pumps the contents of the waste tank into the truck tank. Then the waste is pumped out of the truck tank into a local sewage or waste disposal system. Thus, the incineration of the waste material in the burn container on a periodic basis, such as daily, eliminates the removal equipment and, also, the need for a place to dump the waste.

FIGS. 10–12 schematically illustrate the assembly of the panels upon the base. In FIG. 10, the front panel, with its door, is assembled by sliding it endwise relative to the base so that its lower edge tongues 33 fit within the channel member 30 that is attached to the base 25. Similarly, the side panel 13 is assembled to the base. Then the channel member 40 is slid downwardly to grasp and connect the adjacent edges of the two panels. FIG. 11 illustrates the assembly of the rear panel 14 upon the base 20 in a similar fashion.

Another channel member 40 is applied to the adjacent vertical edges of the rear and side panels. FIG. 12 illustrates the assembly of the opposite side panel 12 upon the base. Again the vertical edges of the adjacent pair of panels are interconnected by vertical channels members 40. The channel members are schematically shown in the drawings, by positioning a vertical channel member 40 above the adjacent pair of panel edges so that they may be manually shoved downwardly to capture the panel vertical edge flanges or tongues 54. Thus, the corners of the cabana are frictionally and resiliently formed by the assembled tongues and channels.

To provide ventilation for the cabana, the wall panels may be provided with screened openings 80 formed across their upper portion. Also, a vent pipe 81 may have its lower end inserted into an opening 82, formed in the waste tank 20, and its upper end extended through a corresponding opening 84 in the roof 19.

The panels and waste tank may be formed of a high density polyethylene or other available plastic material. To rigidify the panels and the tanks, ridges or corrugations or similar deformations may be formed in their surfaces by thermoforming to stiffen them. This is conventional.

The connector channel members may be formed of extruded aluminum or an extruded plastic material, as for example, an acrylonitrile styrene acrylate or other weather resistant, strong plastic that is commercially available.

The foregoing construction permits the stacking of the number of panels for the same restroom. Alternatively, panels from different restrooms may be stacked, along with the other components, for storage or for loading upon a truck or within an airplane. When the components are delivered to a site where restrooms are needed, the personnel at the site may select the appropriate components and manually assemble them. Normally, this can be accomplished without any tools. Once the components are assembled, the restrooms may be used for as long as necessary. By periodically removing and incinerating the contents of the burn containers, the restroom units are readily available at all times for use by a considerable number of people.

When the units are no longer needed, they may be rapidly disassembled by lifting the covers and pulling the corner connector channels upwardly to disengage the vertical edges of the panels and removing each of the panels by sliding it endwise from the base. This rapid, simplified disassembly, makes this unit particularly useful for delivery by aircraft to sites where an emergency camp or collection place is prepared for relatively large numbers of people.

This invention may be further developed within the scope of the following claims. Thus, having fully described an operative embodiment of this invention, we now claim:

1. A portable, knockdown toilet comprising a cabana having a floor forming base and substantially similar wall panels which form normally vertically arranged, opposite side walls and a rear wall, and a front wall panel having an access opening covered by a door, and a roof cover;

the lower edges of each of the panels are engaged with corresponding peripheral edge portions of the base by cooperating, releaseable connection members temporarily securing the lower edges of the panels to said base for forming a cabana enclosure releasable connection members enabling movement of said panels with respect to said base once connection is made;

and elongated channel members frictionally engaging and temporarily securing together adjacent vertical edges of each adjacent pair of panels;

interconnecting fastening members arranged at the upper edges of the panels and on the peripheral edges of the roof cover temporarily securing the roof cover over the enclosure provided by the wall panels;

and a toilet waste receiving and holding tank having a toilet waste receiving opening therein, removeably positioned upon the base within the enclosures;

said panels, base, roof cover and tank being normally separable from each other and being manually assembled together;

whereby the panels being manually assembled upon the base and connected to each other and the roof for providing a temporarily assembled toilet cabana, within which the tank may be positioned for periods of time when needed and being disassembled manually for transporting and storage of the separated disassembled parts when the toilet is not needed.

2. A portable, knockdown toilet cabana as defined in claim 1, and including horizontal pins and corresponding pin receiving holes formed along the upper edges of the panels and the adjacent portions of the roof covering such upper ends for temporarily holding and connecting the roof upon the panels for covering the enclosure formed by the panels.

3. A portable, knockdown toilet cabana as defined in claim 1, and including said channel members formed with an adjacent pair of vertically extending channels and the adjacent pairs of panels having adjacent vertical edge tongue portions slidably fitted with said channels and being frictionally held within such channels for manually interengaging the adjacent pairs of panels and temporarily securing them together for forming the enclosure.

4. A construction as defined in claim 3, and the adjacent edge tongues being substantially free of mechanical connection to each other apart from their connecting channels.

5. A construction as defined in claim 1 and including said panel lower edge and base releasible connecting members being formed of horizontally arranged channels slidably receiving corresponding, closely fitted horizontally extending tongues, so that the panels may be connected to the base by slidably engaging the tongues within their respective adjacent channels for frictionally securing the panels and base together.

6. A portable knockdown toilet cabana as defined in claim 1, and including a removable, metal waste disposal container positioned within the waste tank beneath said waste receiving opening for receiving and holding waste material;

with said metal container being manually removable from and replaceable within the waste tank so that waste contained therein may be removed from the cabana and either burned within the waste holding tank or otherwise dumped from the metal container and the container may be replaced within the tank.

7. A portable knockdown toilet cabana as defined in claim 1, and including the adjacent vertical edges of each adjacent pair of panels being temporarily interconneted by a vertically elongated channel member having grooves extending substantially the full heights of the panel and vertically elongated tongues formed on the panel edges, with vertically elongated tongues shaped for fitting into and for frictional engagement within its adjacent channel member groove for manually sliding the tongues into the respective channel member groove for temporarily securing the adjacent panels together to form the cabana enclosure and for manually separating the panels for disassembly of the cabana.

8. A construction as defined in claim 7 and the upper edges of each of the panels and the portions of the roof overlapping said upper edges being formed with outwardly extending pins and with holes to receive said pins for temporarily interconnecting the cover, and holding the cover in place, upon the wall panels.

9. A corner connector for securing together the adjacent vertical edge flanges of a pair of adjacent panels which form a cabana structure and the like enclosure, with the vertical edge flanges having free edge portions, comprising;

a vertically elongated channel member formed with a pair of adjacent, vertically extending channels separated by a divider flange, with the channels including external flanges spaced away from the divider flange so that the channels adapted to each receive and hold the free edge portion of an edge flange of said panels such that the free edge portion is frictionally held in the channels between said external flanges and said divider flange;

said divider flange extending outwardly from the channels and having laterally extending flange portions oppositely extending from each other and at less than ninety degrees relative to the divider flange for frictionally engaging and holding a portion of the edge flange of each of the panels and positioning the free edge portions within said channels.

10. A construction as defined in claim 9, and including said external flanges each having free edges terminating in curved portions adopted to interlock with the free edge portion of the panel edge portion and with said external flanges being arranged at less than ninety degrees relative to the divider flange for providing a frictional engagement with the panel free edge portion adjacent thereto;

whereby the panel free edge portions each may be grasped within a channel member channel and simultaneously each channel member external flange and its adjacent panel free edge portion are held together.

11. In a portable toilet comprising:

a cabana enclosure within which a waste collection tank is positioned, with the tank having a cover through which an opening is provided for deposit of human waste through said opening into the tank;

a waste collecting container fitted within the tank beneath said opening for receiving waste deposits, with said containers forming a separable lining within the tank;

said container being formed of a fire resistant material comprising of sheet steel material;

the cover of said tank being positioned within the cabana enclosure and being openable inside the cabana enclosure to enable access to the thank and said cover being openable relative to the tank for providing access to the container while the container is inside the cabana enclosure;

said container being manually removable from said tank and, therefore, from said cabana;

whereby the waste contained within said container may be burned periodically by manually removing, the container from the tank and carrying it a distance from the cabana and applying a flammable material to the tank for burning the contents thereof, following which, the container may be replaced manually within the tank for future use.

12. A construction as defined in claim 11, and including said tank being in the form of an approximately rectangular shape for positioning upon a floor or base forming part of said enclosure, and said container being similarly shaped in a generally rectangular shape into a box configuration having an open top for relatively closely fitting within the tank;

and said container being provided with hand grasping portions for manually lifting the container upwardly out of the tank, when the cover of the tank is opened, for manual removal of the container from the cabana enclosure.

* * * * *